United States Patent [19]

Abbott

[11] 4,336,143

[45] Jun. 22, 1982

[54] CONTROLLING THE TREATMENT OF MIXTURES COMPRISING SOLID AND LIQUID

[75] Inventor: John Abbott, Burton-on-Trent, England

[73] Assignee: Coal Industry (Patents) Limited, London, England

[21] Appl. No.: 177,038

[22] Filed: Aug. 11, 1980

[30] Foreign Application Priority Data

Sep. 21, 1979 [GB] United Kingdom ................ 7932781

[51] Int. Cl.$^3$ ............................................ B01D 21/24
[52] U.S. Cl. .................................. 210/740; 210/96.1; 210/103; 210/110; 210/112; 210/143
[58] Field of Search ................................ 210/739–740, 210/96.1, 103, 110, 112, 134, 135, 141, 143

[56] References Cited

U.S. PATENT DOCUMENTS

| 4,045,342 | 8/1977 | Kuster | 210/740 |
| 4,160,734 | 7/1979 | Taylor | 210/103 |
| 4,168,233 | 9/1979 | Anderson | 210/112 X |
| 4,198,298 | 4/1980 | Zuckerman | 210/739 |
| 4,226,714 | 10/1980 | Furness et al. | 210/740 X |

*Primary Examiner*—John Adee
*Attorney, Agent, or Firm*—James C. Wray

[57] ABSTRACT

In the control of the treatment of a mixture (eg slurry, tailings or sludge) comprising solid (eg fine coal, shale, or clay) and liquid (eg water) signals are derived which are indicative of the total liquid in the mixture fed for treatment and of the cumulative discharged filtrate, the signals being processed to give an indication of the amount of liquid retained in the mixture as the treatment progresses, at least a part of the treatment being controlled in response to the derived signal comparison.

4 Claims, 1 Drawing Figure

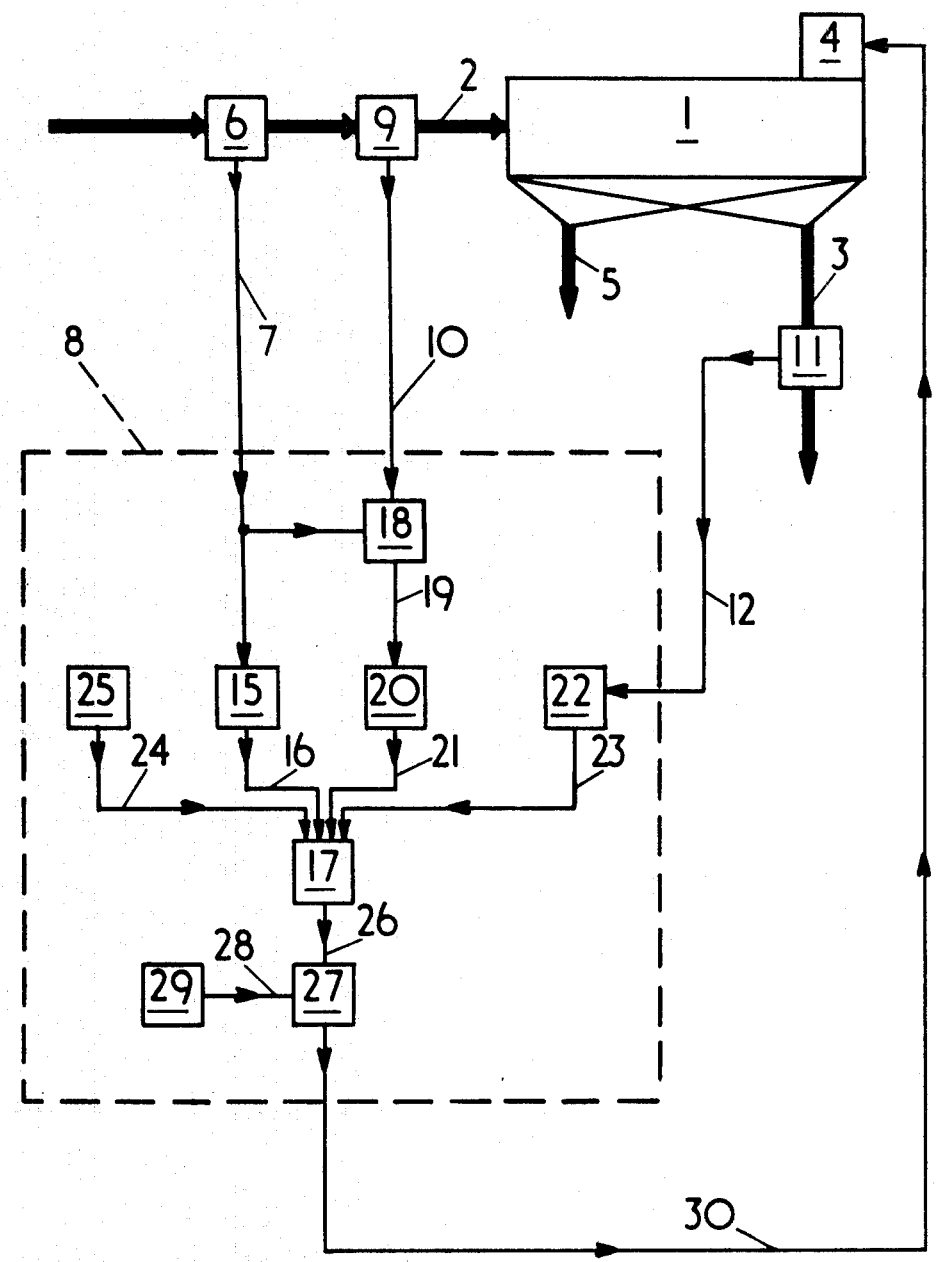

CONTROLLING THE TREATMENT OF MIXTURES COMPRISING SOLID AND LIQUID

This invention relates to methods of and apparatus for controlling the filtration of mixtures comprising solid and liquid.

In particular, although not exclusively, the present invention relates to methods of, and apparatus for controlling the removal of water in slurry or sludge filtration equipment.

It is common practice with known slurry or sludge filtration equipment for the slurry or sludge (ie a mixture of solid and liquid) to be pumped into a filter press and for the slurry or sludge to be subjected to pressure in order to force the filtrate to drain from the slurry or sludge which thereby tends to be left in a relatively dry condition. After the slurry or sludge has been subjected to pressure for a period of time determined by an operator the equipment is actuated to allow the relatively dry solid cakes to discharge from the equipment and a new batch of relatively wet slurry or sludge is fed into the equipment for treatment.

The period of time for which the slurry or sludge is subjected to pressure is left to the operator's discretion and since determination of the end point of the treatment cycle is difficult the operator relies on his experience and his knowledge of the slurry or sludge being treated. Unfortunately, the filtration characteristics of the slurry or sludge being treated are usually variable and in practice the operator frequently tends to misjudge the end point of the treatment cycle. If the pressure is removed too soon and the cycle terminated prematurely the insufficiently treated solid cake will be sticky and difficult to discharge from the treatment equipment. Therefore additional time is required to remove the solid cake and the feeding of the next batch to be treated is delayed and treatment time is lost. If the operator allows the treatment cycle to continue after a particular desired point is reached the treated solid cake will discharge freely from the treatment equipment but once again the feeding of the next batch to be treated is delayed due to the previous overlong treatment cycle and treatment time is lost.

It will be appreciated that by relying upon the operator to determine the end point of the treatment cycle it is probable that the equipment is operated inefficiently and maximum throughput of material is not achieved.

An object of the present invention is to provide an improved method of controlling the slurry or sludge filtration equipment.

According to one aspect of the present invention a method of controlling treatment of a mixture comprising solid and liquid comprises the steps of determining the total liquid in the mixture fed for treatment and deriving a signal indicative of the total liquid in the mixture feed, determining the cumulative amount of filtrate discharged during treatment and deriving a further signal indicative of the cumulative discharged filtrate, processing the two derived signals to give an indication of the amount of liquid retained in the mixture, and at least partly controlling the treatment in response to the derived signal comparison.

Preferably, the cumulative amount of mixture retained during treatment is determined and a signal derived which is indicative of the cumulative retained mixture and which together with said derived signal comparison is used to determine substantially the moisture content of the retained mixture, the treatment being at least partly controlled in response to the determined moisture content of the retained mixture.

Preferably, the treatment is terminated substantially when the determined moisture content reaches or approaches a preselected value.

Preferably, the cumulative amount of mixture retained during treatment substantially is determined from the total amount of mixture fed for treatment less the cumulative discharged filtrate.

Conveniently, the total amount of mixture fed for treatment is determined by sensing the mixture flow rate.

Conveniently, the total liquid in the mixture fed for treatment is determined by sensing the density of mixture fed for treatment.

Preferably, the derived signals are processed by processor means which substantially continuously monitors the signals.

According to a second aspect of the present invention apparatus for controlling treatment of a mixture comprising solid and liquid, in accordance with the method defined above, comprises sensor means for determining the total liquid in the mixture fed for treatment and for deriving signal means indicative of the total liquid in the mixture feed, further sensor means for determining the cumulative amount of filtrate discharged during treatment and for deriving further signal means indicative of the cumulative discharged filtrate, processor means for comparing the two derived signal means to give an indication of the amount of liquid retained in the mixture, and control means for controlling at least part of the treatment in response to the derived signal means comparison made by the processor means.

Preferably, means are provided for determining the cumulative amount of mixture retained during treatment and for deriving signal means which is indicative of the cumulative retained mixture and which together with said derived signal means comparison is used by the processor means to determine substantially the moisture content of the retained mixture, the control means controlling at least part of the treatment in response to the determined mositure content of the retained mixture.

Preferably, the control means terminates the treatment substantially when the determined moisture content reaches or approaches a preselected value.

The processor means comprises said means for determining the cumulative amount of mixture retained during treatment, the cumulative amount of mixture retained substantially being determined from the total amount of mixture fed for treatment less the cumulative discharged filtrate.

Conveniently, the total amount of mixture fed for treatment is determined by sensing the mixture flow rate.

Conveniently, the total liquid in the mixture fed for treatment is determined by sensing the density of the mixture fed for treatment.

By way of example only, one embodiment of the present invention will be described with reference to the accompanying drawing which shows a block circuit diagram of apparatus for controlling the treatment of thickened flotation tailings in filter press equipment on a coal preparation plant.

The filter press equipment 1 comprises a plurality of recessed chambers having press plates and arranged to be fed with thickened flotation tailings comprising a mixture of fine shales and clays in water, ie a mixture of solid and liquid. The thickened tailings are pumped into the filter press chambers via a feed pipe 2 such that the chambers first are filled with mixture which then is subjected to the pump pressure which forces water to drain from the slurry through filter cloths and discharge from the filter press via outlet pipe 3. Upon the termination of the treatment cycle the pump pressure is cut off from the filter press which then is actuated under the action of control means 4 to open the press plates permitting the treated relatively dry solid cakes to be discharged via discharge means 5. Upon the discharge of the solid cakes the treatment cycle is repeated under the action of control means 4 and a new batch of thickened tailings is pumped into the filter press for treatment.

First sensor means 6, for example, an electromagnetic flow meter is provided to determine the volume flow rate of the untreated mixture pumped along pipe 2 and fed to the filter press. The sensor means 6 derives a signal indicative of the volume flow rate of total mixture fed to the filter press, the signal being passed along line 7 to processor means 8 the function of which will be discussed later in this specification.

Second sensor means 9, for example, a nucleonic density gauge is provided to determine the pulp density of the feed as it is pumped along line 2 into the filter press and to derive a signal indicative of the pulp density of the feed. This signal is passed along line 10 to the previously mentioned processor means 8.

Third sensor means 11, for example, an electromagnetic flow meter is provided to determine the volume flow rate of water ie filtrate discharging from the filter press via outlet 3. The third sensor means deriving a signal indicative of the discharging filtrate volume flow rate which is passed along line 12 to the processor means 8 which thereby substantially continuously determines the cumulative discharged filtrate during the treatment cycle.

Thus, in operation at the start of a treatment cycle with the chambers empty and closed, the control means 4 opens a valve (not shown) in the feed pipe 2 allowing a new batch of mixture to be pumped into the filter press to fill the chambers. Upon the feed pipe being opened by the control means 4 a signal is fed from the control means 4 to the processor means 8 to inform the processor means that a new treatment cycle has begun and to initiate timer means in the processor means which thereby begins to sense the signals fed from sensor means 6, 9 and 11 along lines 7, 10 and 12, respectively.

The derived signal is fed along line 7 to an integrator unit 15 which integrates the rate of flow of the mixture feed with respect to time and which determines the cumulative volume of mixture fed into the filter press during the particular treatment cycle, a signal and pass as a signal along line 16 to a processor unit 17 which is indicative of the cumulative volume of mixture fed to the press. In addition, the derived signal along line 7 is passed to a multiplying unit 18 which also receives the derived signal passed along line 10 from the sensor means 9, and which thereby determines the mass flow rate of mixture fed to the filter press. The multiplying unit 18 derives a signal indicative of the mass flow rate of mixture which is passed along line 19 to an integrator unit 20 which determines the cumulative mass of mixture fed into the filter press during the particular treatment cycle, the integrator unit 20 in turn derives a signal indicative of the cumulative mass of mixture feed which is passed along line 21 to the previously mentioned processor unit 17.

The derived signal fed along line 12 is passed to an integrator unit 22 which integrates the rate of flow of discharged filtrate and which thereby determines the cumulative volume of filtrate discharged during the treatment cycle, the integrator unit 22 deriving a signal indicative of the cumulative volume of filtrate discharged during the treatment cycle which is passed along line 23 to the processor unit 17.

The processor unit 17 is fed with one more signal via line 24 from a preset manually adjustable unit 25, the preset signal being representative of the density of the solid in the mixture feed.

Upon receiving all the above mentioned signals the processor unit 17 derives a value Mc according to the following equation:

$$Mc = \frac{100\left[\frac{\rho s}{\rho s - 1}\int Q - \frac{1}{\rho s - 1}\int Q\rho_F - \int F\right]}{\int Q\rho_F - \int F}$$

where

Mc = calculated percentage moisture content of the material within the filter press during present treatment cycle;

$\rho s$ = density of solids in mixture (ie a preset value);

$\int Q$ = total volume of mixture fed to the filter press during the present treatment cycle; Q being the volume flow rate of the mixture determined by the first sensor means 6;

$\int Q\rho F$ = total mass of mixture fed to the filter press during the present treatment cycle; Q F being the mass flow rate of the mixture feed determined by the first sensor means 6, the second sensor means 9; and the multiplier unit 18.

$\int F$ = cumulative volume of filtrate discharged from the filter press during the present treatment cycle; F being the flow rate of discharge of filtrate determined by the third sensor means 11;

The above formula is obtained from the following information and calculation:

TABLE 1

| | Solid (%) | Water % | Mixture % |
|---|---|---|---|
| By Mass | s | 100 − s | 100 |
| By Volume | $\frac{s}{\rho s}$ | 100 − s | $100 - s + \frac{s}{\rho s}$ | where s = % of Solid in Mixture

Using the information in Table 1 pulp density of mixture fed for treatment $$\rho F = \frac{100}{100 - s + \frac{s}{\rho s}}$$

$$\therefore \rho F = \frac{100}{100 - s\left(1 - \frac{1}{\rho s}\right)}$$

$$100\rho F - \rho F S\left(1 - \frac{1}{\rho s}\right) = 100$$

$$100(\rho F - 1) = \rho F s\left(1 - \frac{1}{\rho s}\right)$$

-continued $$\text{Hence } s = \frac{100(\rho F - 1)}{\rho F\left(1 - \frac{1}{\rho s}\right)}$$

The total mass of solid within the filter press at any one time $= (s/100)\int Q\rho F$
which substituting for $s=$ $$\rho F \frac{(\rho F - 1)}{\left(1 - \frac{1}{\rho s}\right)} \int Q\rho F$$

Total mass of water = Total Mass of mixture − Total mass of solid within filter press $$= \int Q\rho F - \frac{(\rho F - 1)}{\rho F\left(1 - \frac{1}{\rho s}\right)} \int Q\rho F$$

$$= \int Q\rho F \left[1 - \frac{(\rho F - 1)}{\rho F\left(1 - \frac{1}{\rho s}\right)}\right]$$

$$= \int Q\rho F \left[\frac{\rho F \frac{(\rho s - 1)}{\rho s} - \rho F + 1}{\rho F \frac{(\rho s - 1)}{\rho s}}\right]$$

$$= \int Q\rho F \left[\frac{\rho F - \frac{\rho F}{\rho s} - \rho F + 1}{\rho F \frac{(\rho s - 1)}{\rho s}}\right]$$

$$= \int Q\rho F \left[\frac{\rho s - \rho F}{\rho F(\rho s - 1)}\right]$$

$$= \int Q\rho F \left[\frac{\rho s}{(\rho s - 1)\rho F} - \frac{1}{\rho s - 1}\right]$$

$$= \frac{\rho s}{\rho s - 1} \int Q - \frac{1}{\rho s - 1} \int Q\rho F$$

Percentage Moisture Content of the material within filter press
$$= \frac{100 \times \text{water in material}}{\text{Mass of material}}$$

$$= \frac{100 \times (\text{Total mass of water} - \text{cumulative mass of discharged filtrate})}{\text{Total mass of mixture fed for treatment} - \text{cumulative mass of discharged filtrate}}$$

$$= 100 \left[\frac{\frac{\rho s}{\rho s - 1}\int Q - \frac{1}{\rho s - 1}\int Q\rho F - \int F}{\int Q\rho F - \int F}\right]$$

A signal derived by the processor unit 17 and indicative of the calculated moisture content of the material within the filter press is passed along line 26 to a comparator unit 27 which compares this derived signal with a preset signal passed along line 28 from a preset manually adjustable unit 29, the preset signal being representative of the desired moisture content of treated slurry mixture. It will be appreciated that as the treatment cycle progresses and more filtrate is progressively discharged from the filter press the calculated value of Mc progressively decreases. When the calculated value of Mc reaches the preset value passed along line 28 and the desired end point for the treatment cycle is reached, an indicative signal is passed along line 30 to the control means 4 which thereby activates the filter press mechanism to shut off the pump supply along line 2 and to open the chambers allowing treated relatively dry solid cakes to fall from the chambers and be discharged from the filter press. Once all the solid cakes have been removed from the filter press the control means 4 is reactivated to close the press chambers and reopen feed line 2 allowing the next batch of thickened tailings to be pumped into the empty closed chambers of the filter press. Hence, another treatment cycle is started and the whole of the above procedure is repeated.

From the above description it will be seen that the present invention provides a method of and apparatus for controlling filter press slurry treatment equipment which enables a desired moisture content of the press cakes to be obtained. No uncertainties arise due to the equipment operator determinating the end point of the treatment cycle.

The invention also can be used with other slurry or sludge treatment equipment, for example sewage treatment equipment.

I claim:
1. A method of controlling treatment apparatus for removing water from a water/solids mixture, comprising the steps of:
 (a) determining the volume flow rate of untreated water/solids mixture,
 (b) deriving a signal indicative of said determined volume flow rate of untreated mixture,
 (c) integrating said derived signal to determine the cumulative volume of untreated mixture fed for treatment,
 (d) determining the density of the untreated water/solids mixture,
 (e) deriving a signal indicative of said determined density,
 (f) multiplying both said derived signals to derive a signal indicative of the mass flow rate of the untreated water/solids mixture fed for treatment,
 (g) integrating the derived signal indicative of the mass flow rate of the untreated mixture to determine the cumulative mass of the untreated mixture fed for treatment,
 (h) determining the volume flow rate of filtrate water discharging from the mixture under treatment,
 (i) deriving a signal indicative of said determined volume flow rate of filtrate water,
 (j) integrating said derived signal indicative of the volume flow rate of filtrate water to determine the cumulative volume of discharged filtrate water,
 (k) processing said derived signals indicative of the cumulative volume of untreated mixture fed for treatment, of the cumulative mass of untreated mixture fed for treatment, and of the cumulative volume of discharged filtrate water to derive a signal indicative of the moisture content of the mixture undergoing treatment,

(l) comparing the derived signal indicative of the moisture content of the mixture undergoing treatment with a preset signal indicative of a desired moisture content of the treated mixture, and (m) terminating the treatment when the derived signal indicative of the moisture content of the mixture undergoing treatment reaches said preset signal indicative of the desired moisture content of the treated mixture.

2. The method of claim 1 wherein the processing step comprises calculcating said moisture content according to the following equation:

$$Mc = \frac{100\left[\frac{\rho s}{\rho s - 1} \int Q - \frac{1}{\rho s - 1} \int Q\rho_F - \int F\right]}{\int Q\rho_F - \int F}$$

where

Mc = calculated percentage moisture content of the mixture undergoing treatment;

$\rho s$ = a preset value indicative of the density of solids in the untreated mixture;

$\int Q$ = cumulative volume of untreated mixture fed for treatment, Q being the volume flow rate of the untreated mixture;

$\int Q\rho F$ = cumulative mass of untreated mixture fed for treatment, $Q\rho F$ being the mass flow rate of the untreated mixture fed for treatment;

$\int F$ = cumulative volume of discharged filtrate water, F being the volume flow rate of filtrate water discharging from the mixture under treatment.

3. Treatment apparatus for removing water from a water/solids mixture comprising (a) sensor means for determining the volume flow rate of untreated water/solids mixture, (b) signal means for deriving a signal indicative of said determined volume flow rate of untreated mixture, (c) means for integrating said derived signal to derive a signal indicative of the cumulative volume of untreated mixture fed for treatment, (d) sensor means for determining the density of the untreated water/solids mixture, (e) signal means for deriving a signal indicative of said determined density, (f) means for multiplying both said derived signals to derive a signal indicative of the mass flow rate of the untreated water/solids mixture fed for treatment, (g) means for integrating the derived signal indicative of the mass flow rate of the untreated mixture to derive a signal indicative of the cumulative mass of the untreated mixture fed for treatment, (h) sensor means for determining the volume flow rate of filtrate water discharging from the mixture under treatment, (i) signal means for deriving a signal indicative of said determined volume flow rate of filtrate water, (j) means for integrating said derived signal indicative of the volume flow rate of filtrate water to derive a signal indicative of the cumulative volume of discharged filtrate water, (k) processor means for processing said derived signals indicative of the cumulative volume of untreated mixture fed for treatment, of the cumulative mass of untreated mixture fed for treatment, and of the cumulative volume of discharged filtrate water to derive a signal indicative of the moisture content of the mixture undergoing treatment, (l) comparator means for comparing the derived signal indicative of the moisture content of the mixture undergoing treatment with a preset signal indicative of a desired moisture content of the treated mixture, and (m) control means for terminating the treatment when the derived signal indicative of the moisture content of the mixture undergoing treatment reaches said preset signal indicative of the desired moisture content of the treated mixture.

4. The apparatus of claim 3 wherein the processor means comprises a signal processing unit which calculates said moisture content according to the following equation:

$$Mc = \frac{100\left[\frac{\rho s}{\rho s - 1} \int Q - \frac{1}{\rho s - 1} \int Q\rho_F - \int F\right]}{\int Q\rho_F - \int F}$$

where

Mc = calculated percentage moisture content of the mixture undergoing treatment;

$\rho s$ = a preset value indicative of the density of solids in the untreated mixture;

$\int Q$ = cumulative volume of untreated mixture fed for treatment, Q being the volume flow rate of the untreated mixture;

$\int Q\rho F$ = cumulative mass of untreated mixture fed for treatment, $Q\rho F$ being the mass flow rate of the untreated mixture fed for treatment;

$\int F$ = cumulative volume of discharged filtrate water, F being the volume flow rate of filtrate water discharging from the mixture under treatment.

* * * * *